No. 662,765. Patented Nov. 27, 1900.
J. F. CHASE.
CONDENSING APPARATUS.
(Application filed Aug. 29, 1900.)

(No Model.)

Witnesses
Robt. B. Wasson
Ed. J. Redmond

Inventor
John F. Chase
by W. A. Redmond
Attorney

THE NORRIS PETERS CO., PHOTO-LITHO., WASHINGTON, D. C.

UNITED STATES PATENT OFFICE.

JOHN FRANCIES CHASE, OF ST. PETERSBURG, FLORIDA.

CONDENSING APPARATUS.

SPECIFICATION forming part of Letters Patent No. 662,765, dated November 27, 1900.

Application filed August 29, 1900. Serial No. 28,463. (No model.)

*To all whom it may concern:*

Be it known that I, JOHN FRANCIES CHASE, a citizen of the United States, residing at St. Petersburg, in the county of Hillsborough and State of Florida, have invented certain new and useful Improvements in Condensing Apparatus; and I do declare the following to be a full, clear, and exact description of the invention, such as will enable others skilled in the art to which it appertains to make and use the same.

This invention relates generally to water condensing or distilling apparatus, and particulary to that type or class of such apparatus as are adapted to domestic use; and it has for its object to provide a simple, inexpensive, and durable condenser having in compact form a large area of condensing-surface; and it consists of the parts and combinations of parts hereinafter described and claimed.

Figure 1:
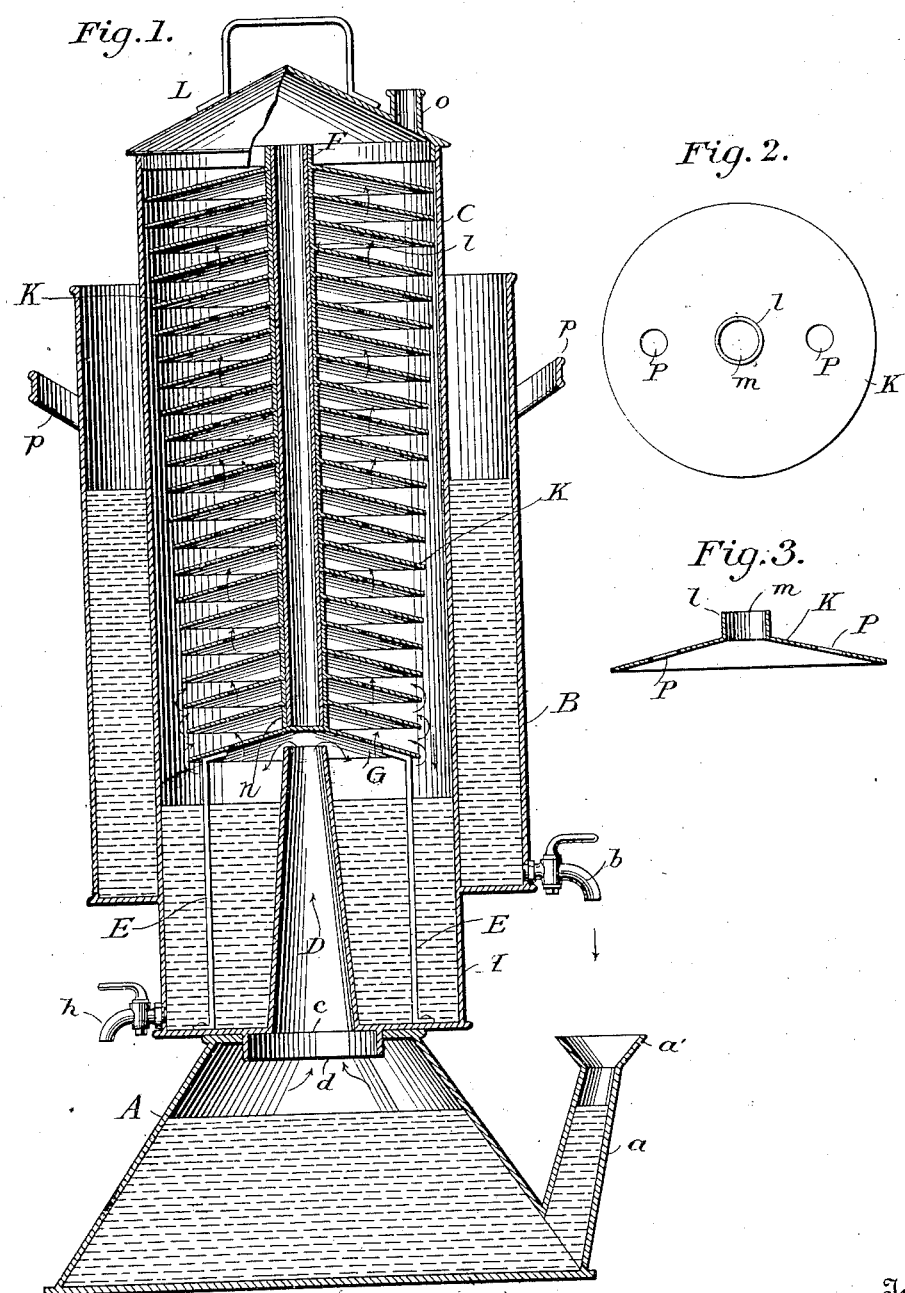
Figure 2:
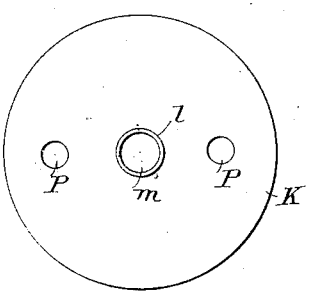
Figure 3:
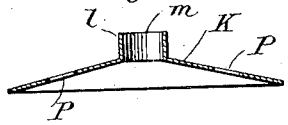

In the accompanying drawings, forming a part of this specification, Figure 1 is a vertical section through my improved condensing apparatus; Fig. 2, a plan view of one of the convexo-concave disks; and Fig. 3, a section on the line $x\,x$, Fig. 2.

Similar letters refer to similar parts throughout the several views.

In the drawings, A represents an ordinary tea-kettle provided with a spout $a$, which is preferably formed with an enlarged mouth $a'$, through which water from the reservoir or water-jacket B of the apparatus may be fed to the kettle through the faucet $b$.

The apparatus proper consists of a metallic vessel C, having an opening $c$ in the bottom from which a conical or tapered tube D projects upwardly, said opening $c$ being surrounded by a downwardly-extending flange $d$, adapted to fit closely within the mouth of the kettle, as shown, whereby the steam generated in the kettle may escape directly through the tube into the vessel C. The bottom of the vessel rests on the top of the kettle, and the flange $d$ serves to prevent the escape of the steam elsewhere than in the vessel and also serves to guide the vessel into proper position on the kettle and prevents the apparatus being accidentally pushed or moved out of position after being placed on the kettle.

Surrounding and forming a part of the vessel C is a water jacket or reservoir B, having a faucet $b$, which may be arrayed in line with the mouth of the spout $a$ in order to supply the kettle with water, as mentioned above, and through which the water may be drawn from the reservoir or water-jacket for other purposes. The main object of this reservoir or water-jacket is to supply the kettle with water which has become heated from contact with the wall of the vessel C, the latter being heated by the steam from kettle A; but the water in the reservoir or water-jacket also serves as a medium for cooling the vessel C, and thus assists to some extent in the condensation of the steam contained in said vessel.

Within the vessel C is centrally arranged a vertical post F, preferably hollow, the lower end of which is closed by a convexo-concave or conical disk G, to which said post is secured, and uprights E, secured to said disk and to the bottom of the vessel, serve to support the disk at the desired height above the end of the tube, leaving a reservoir H at the lower part of the vessel to receive the water of condensation, from which reservoir it may be drawn through the faucet $h$. Above the disk G a series of conical or convexo-concave disks K are arranged one above the other on the post F, each of said disks being provided with an integral collar $l$, surrounding a central opening $m$ therein, which fits over said post F, each of said disks resting on the collar of the disk next below in the series and the last or lowermost of the series resting on the collar $n$ of the disk G. As will be noted, the disks are progressively greater in diameter from the bottom or lowermost disk G upwardly, the upper disk H being of such diameter as to nearly fill the vessel, as clearly shown in Fig. 1. Each of the disks is formed with an opening P at each side of its center for the passage of the steam therethrough, and in arranging the disks on the post they are so placed that the openings in no two adjacent disks are in vertical alinement. A cover or top L is provided for the vessel, having a tube $o$, through which air may find its way to the interior of the vessel.

The reservoir or water-jacket B is provided with handles $p$, whereby the apparatus may be moved, and said reservoir does not fully cover the vessel, but terminates at points below its top and bottom, so that about twothirds of the wall of the vessel is exposed to the cooling influence of the air.

In practice the water-jacket B is supplied with water and the apparatus placed on a kettle containing water and the kettle placed over a fire. As soon as the steam is generated in the kettle it escapes therefrom through the tube D and, impinging against the under side of the disk G, is deflected in all directions, as indicated by the arrows, a part of it escaping through the openings P to the disk next above and a part escaping at the periphery of said disk and ascending till it is deflected or caught by the projecting edge of the disk next above or one of the series above and travels up the inclined or concave face of the intercepting-disk and passes through the openings therein to the next disk. A portion of the steam passes over the edges of each disk as well as through the openings; but it is evident that practically the whole volume is caught by the disks at some point before it can pass out of the vessel. The contact of the steam with the disks and the wall of the vessel causes it to condense, and the water therefrom trickles down into reservoir H, from which it may be drawn as desired.

It will be observed that the arrangement of the disks so that they are progressively of less diameter as they descend the post permits the condensed water from all the disks to fall unobstructed into the reservoir H below. Also I regard in the present instance the words "conical" and "convexo-concave" as equivalents and desire it to be understood that both of such shaped disks come within the scope of my invention.

Having thus described my invention, what I claim as new, and desire to secure by Letters Patent, is—

1. A water still or condenser, comprising a closed vessel having an inlet for steam, and an inlet for air, and a series of disks arranged one above the other and graduated in size from the top disk downward and forming condensing-surfaces.

2. A water still or condenser comprising a vessel having an inlet for steam, and a series of conical disks arranged one above the other within said vessel, said disks being of progressively greater diameter from the bottom disk upwardly.

3. A condenser comprising a vessel having an inlet for steam, a reservoir or water-jacket surrounding said vessel, and a series of conical disks graduated in diameter from the top disk downwardly and formed with openings, whereby the steam may escape from one to the other of the disks in the series.

4. A condenser comprising a vessel having an opening in its bottom, a tube projecting from said opening within the vessel, a vertical post, a disk secured to said post, uprights for supporting said disk, and a series of conical disks having openings therein arranged one above the other on said post, said disks being of progressively greater diameter from the bottom one upward.

5. A condenser comprising a vessel having an inlet for steam and an inlet for air, a tapered tube communicating with said steam-inlet, conical disks having openings therein arranged one above the other on said post so that the openings in no two adjacent disks register, and a reservoir or water-jacket surrounding said vessel.

In testimony whereof I affix my signature in presence of two witnesses.

JOHN FRANCIES CHASE.

Witnesses:
GRANT J. AIKIN,
ROY S. HANNA.